US008289683B2

(12) United States Patent
Wang

(10) Patent No.: US 8,289,683 B2
(45) Date of Patent: Oct. 16, 2012

(54) CASING FOR ALL-IN-ONE ELECTRONIC DEVICE

(75) Inventor: Jo-Chiao Wang, Taipei County (TW)

(73) Assignee: Aopen Inc, Hsinchih, Taipei County (TW)

( * ) Notice: Subject to any disclaimer, the term of this patent is extended or adjusted under 35 U.S.C. 154(b) by 221 days.

(21) Appl. No.: 12/817,525

(22) Filed: Jun. 17, 2010

(65) Prior Publication Data
US 2011/0176265 A1 Jul. 21, 2011

(30) Foreign Application Priority Data
Jan. 15, 2010 (TW) .............................. 99200867 U

(51) Int. Cl.
*G06F 1/16* (2006.01)
(52) U.S. Cl. .................................. 361/679.02
(58) Field of Classification Search ............. 361/679.02
See application file for complete search history.

(56) References Cited

U.S. PATENT DOCUMENTS

| | | | | |
|---|---|---|---|---|
| 4,832,419 A * | 5/1989 | Mitchell et al. | ......... | 361/679.21 |
| 5,083,290 A * | 1/1992 | Hosoi | ...................... | 361/679.27 |
| 5,107,402 A * | 4/1992 | Malgouires | .............. | 361/679.17 |
| 5,157,585 A * | 10/1992 | Myers | ....................... | 361/679.17 |
| 6,128,186 A * | 10/2000 | Feierbach | ................ | 361/679.27 |
| 6,366,452 B1 * | 4/2002 | Wang et al. | .............. | 361/679.22 |
| 6,366,453 B1 * | 4/2002 | Wang et al. | .............. | 361/679.06 |
| 6,381,125 B1 * | 4/2002 | Mizoguchi et al. | ...... | 361/679.08 |
| 6,381,128 B1 * | 4/2002 | Kramer | .................... | 361/679.55 |
| 6,480,374 B1 * | 11/2002 | Lee | ........................... | 361/679.17 |
| 6,560,093 B1 * | 5/2003 | McLeod et al. | ............ | 361/679.6 |
| 6,618,241 B2 * | 9/2003 | Bang | .......................... | 361/679.6 |
| 7,061,754 B2 * | 6/2006 | Moscovitch | ............ | 361/679.21 |
| 7,145,767 B2 * | 12/2006 | Mache et al. | ............ | 361/679.21 |
| 7,180,731 B2 * | 2/2007 | Titzler et al. | ............ | 361/679.22 |
| 8,074,948 B2 * | 12/2011 | Zou et al. | ...................... | 248/157 |

* cited by examiner

*Primary Examiner* — Lisa Lea Edmonds
(74) *Attorney, Agent, or Firm* — Muncy, Geissler, Olds & Lowe, PLLC

(57) ABSTRACT

A casing for all-in-one electronic devices includes a main body and a rail assembly. The main body has a bottom surface and a through hole disposed opposite to the bottom surface. The through hole communicates an interior of the main body. The rail assembly has a guide member and a slide member. The guide member is disposed in the main body, and extends toward the through hole. The slide member is movably combined with the guide member to be moved in a longitudinal direction to pass through the through hole, so as to protrude out of the main body. A display is fixed to one end of the slide member to be driven by the slide member, so as to change a height of the display relative to the bottom surface of the main body.

15 Claims, 12 Drawing Sheets

CASING FOR ALL-IN-ONE ELECTRONIC DEVICE

CROSS-REFERENCES TO RELATED APPLICATIONS

This non-provisional application claims priority under 35 U.S.C. §119(a) on Patent Application No. 99200867 filed in Taiwan, R.O.C. on 2010 Jan. 15, the entire contents of which are hereby incorporated by reference.

BACKGROUND OF THE INVENTION

1. Technical Field

The present invention relates to a casing for an all-in-one electronic device, and more particularly to a casing for an all-in-one electronic device which allows removing and replacing a display and changing the height of the display.

2. Related Art

An all-in-one computer combines a display with a computer casing to form a unity. Generally speaking, the all-in-one computer has a similar appearance to a flat-panel-display, except that the all-in-one computer has a greater thickness in order to accommodate a mother board, a hard drive, an optical disk drive, a power supply module, and the like. Since the display is combined with the computer case to form a unity, at least the video transmission cables and display power cables no longer exist outside the all-in-one computer, and the all-in-one computer is more convenient for the user to transport, compared with conventional desktop computers.

However, the all-in-one computer has two disadvantages.

Firstly, in order to prevent the all-in-one computer from having an excessively large volume, the thickness of the all-in-one computer is generally slightly larger than the thickness of an ordinary flat panel display. After a display panel, a backlight module and a display driving circuit are installed, the internal space of the all-in-one computer becomes rather limited. Therefore, electronic components used in the all-in-one computer are generally those used for laptop computers, such as customized mother boards, memory modules for laptop computers, low-voltage central processing units (CPUs), thin-type optical disk drives, and hard disks for laptop computers. These electronic components have a higher cost than electronic components for desktop computers. Since the display panel is combined in the computer casing, it is inconvenient to adjust the height or angle of the display panel.

Secondly, the size of the display panel of an all-in-one computer cannot be changed after the design of the all-in-one computer is finished, and the user cannot replace the original display panel with a larger one. Manufactures must design and manufacture all-in-one computers individually for different display panel sizes, if the display panel of the all-in-one computer fails, the user cannot replace the display panel, and must send the computer to the retailer or manufacture for repair.

Due to these disadvantages, at present the all-in-one computer is still unable to replace ordinary desktop computers.

SUMMARY

Accordingly, the present invention is directed to a casing for an all-in-one electronic device, in which the casing has internal space larger than that of an all-in-one computer in the art, and allows the user to replace a display or adjust the height and angle of the display.

A casing for an all-in-one electronic device of the present invention includes a main body and a rail assembly. The main body includes a bottom surface and a through hole disposed opposite to the bottom surface, and the through hole communicates an interior of the main body. The rail assembly includes a guide member and a slide member. The guide member is disposed in the main body, and extends toward the through hole. The slide member is movably combined with the guide member to be moved in a longitudinal direction, so as to pass through the through hole and to protrude from the main body.

Preferably, the present invention further includes a display, fixed to the slide member, to be driven by the slide member sliding on the guide member, so as to change a height of the display relative to the bottom surface of the main body.

In the present invention, the display is not directly combined in the main body, so the display can be removed and replaced at will. And the main body has a relatively large internal space, so that low-cost electronic components for desktop computers can be used. Through the driving of the slide member, the height of the display can be changed.

Preferably, the display is pivoted to the slide member, such that the display is capable of swaying relative to the slide member, thereby facilitating user adjustment of the display angle.

BRIEF DESCRIPTION OF THE DRAWINGS

The present invention will become more fully understood from the detailed description given herein below for illustration only, and thus are not limitative of the present invention, wherein.

DETAILED DESCRIPTION

Figure 1:
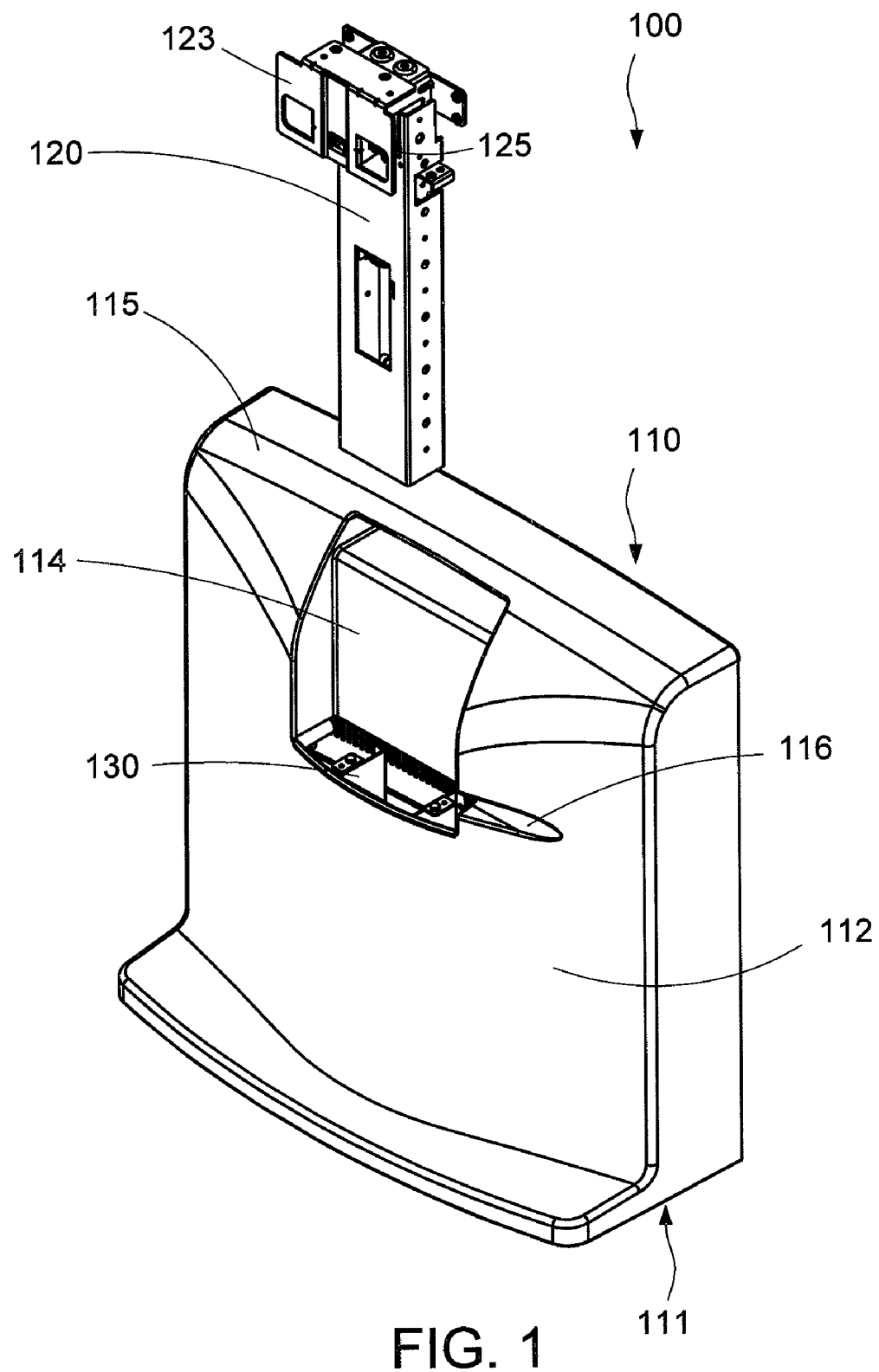
FIG. 1 is an exploded view according to an embodiment of the present invention.
Figure 2:
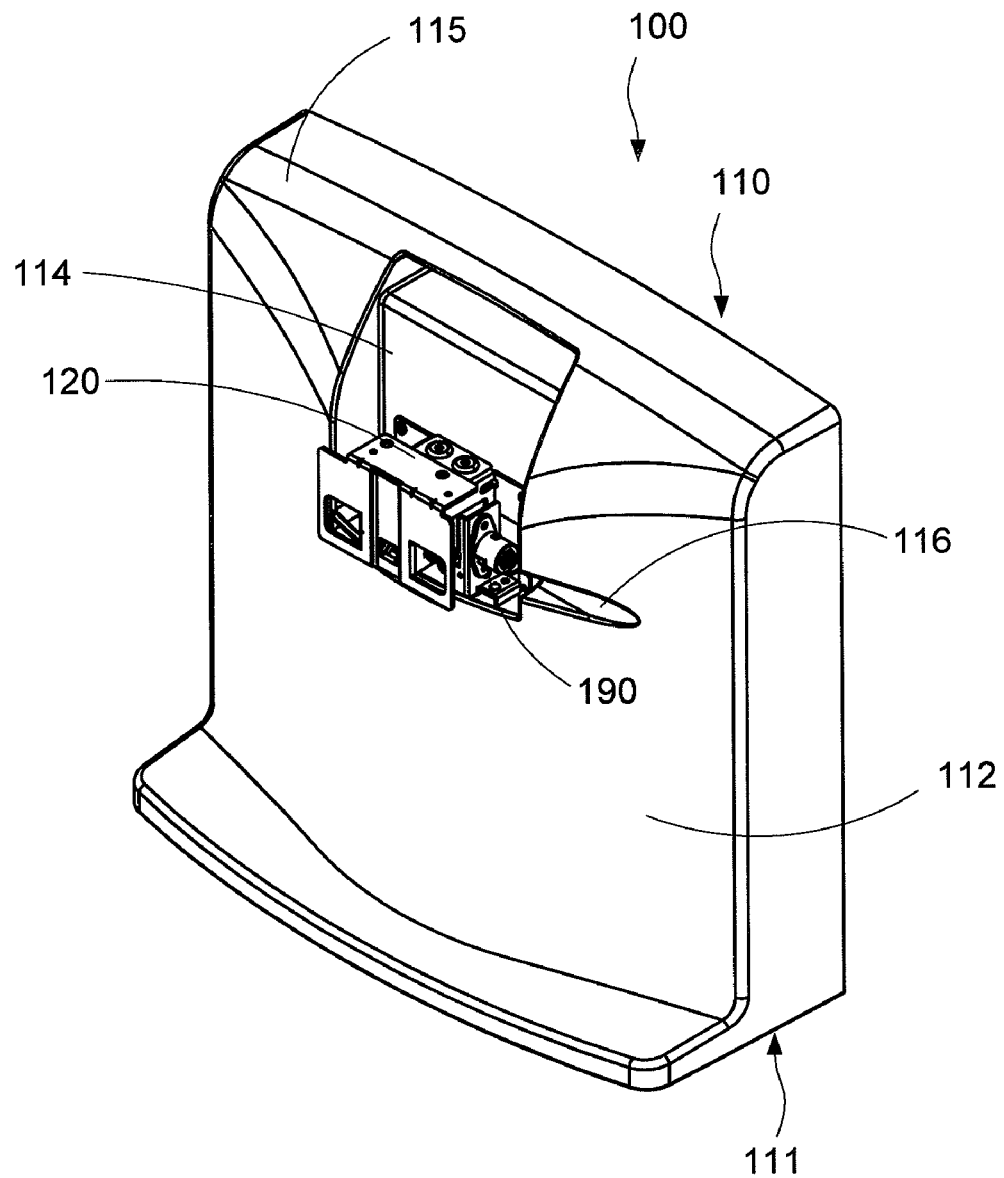
FIG. 2 is a perspective view according to the embodiment of the present invention.

Referring to FIGS. 1 and 2, a casing 100 for an all-in-one electronic device according to an embodiment of the present invention is provided. The casing 100 includes a main body 110 and a rail assembly 120.

Figure 3:
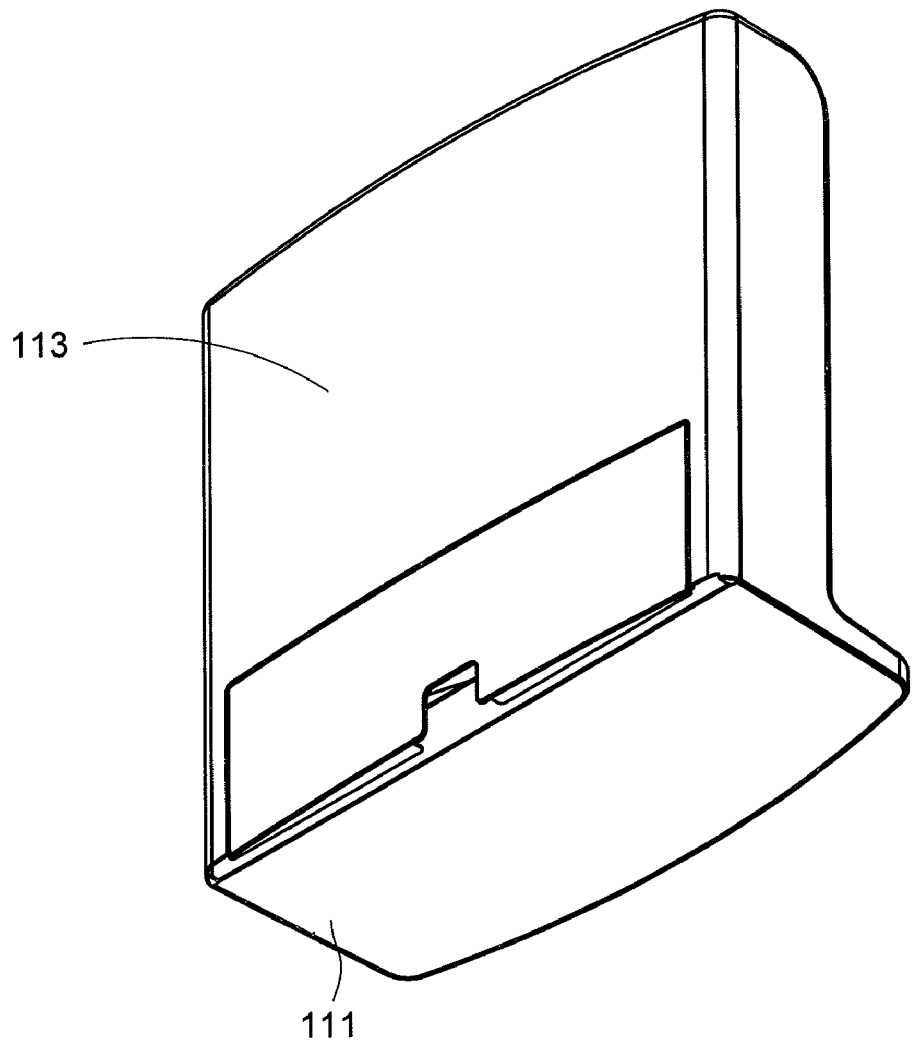
FIG. 3 is another perspective view according to the embodiment of the present invention.

Referring to FIGS. 1 and 3, the main body 110 has a bottom surface 111, a front side surface 112, and a rear side surface 113. The front side surface 112 and the rear side surface 113 respectively connected to two opposite side edges of the bottom surface 111.

The rear side surface 113 is a planar surface, and the front side surface 112 is a convex curved-surface. The main body 110 further includes a through hole 114 located opposite to the bottom surface 111 and communicates with an interior of the main body 110. The through hole 114 is at least partially formed on the front side surface 112. The main body 110 further includes a top surface 115, located opposite to the bottom surface 111 and connects the front side surface 112 and the rear side surface 113. The top surface 115 and the front side surface 112 are connected to each other to form a curved-surface, and the through hole 114 extends from the front side surface 112 to the top surface 115.

Figure 4:
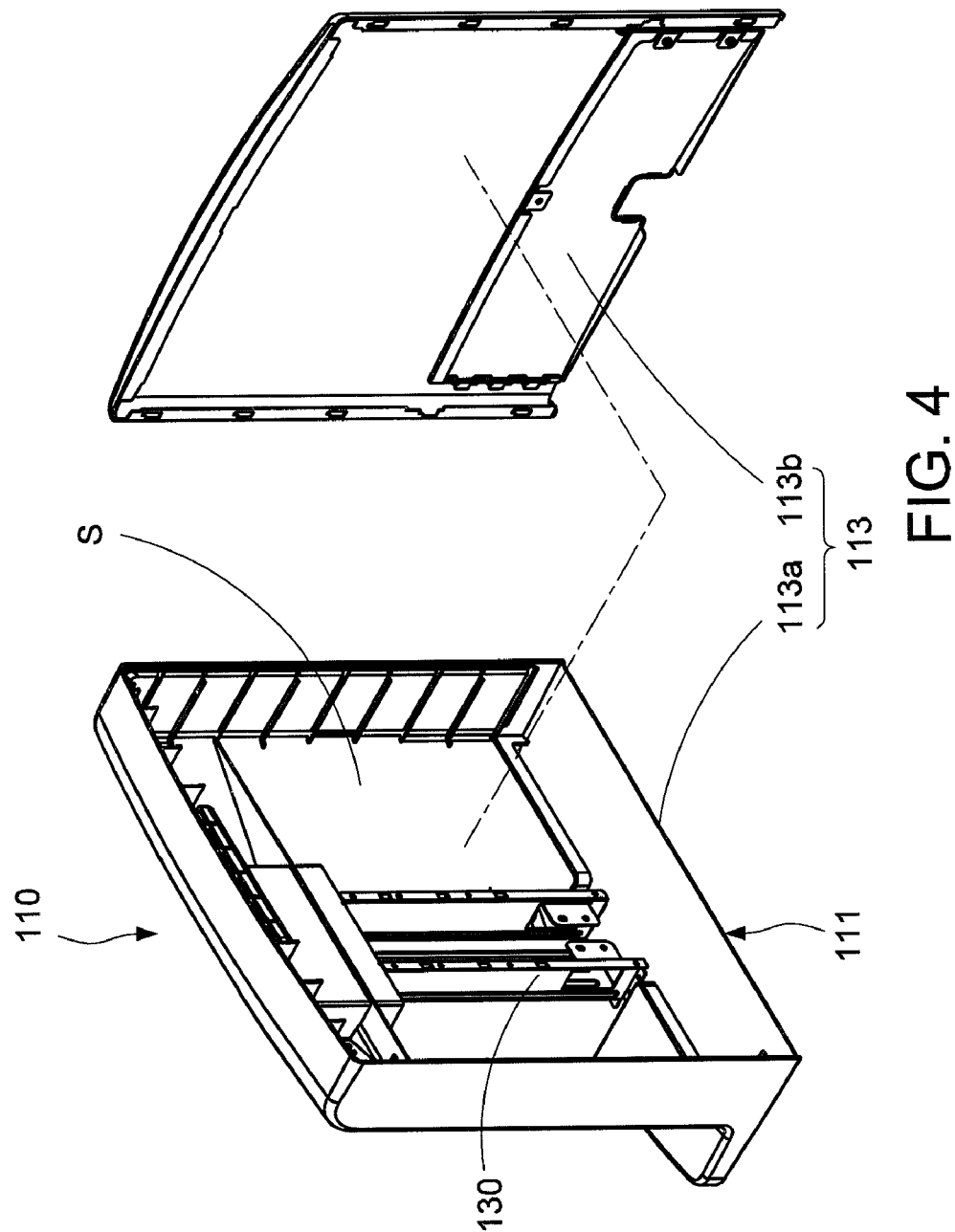
FIG. 4 is an exploded view of a main body according to the embodiment of the present invention.

Referring to FIG. 4, in which the main body 110 has an accommodation space S defined therein for accommodating circuit boards such as a mother board of a computer. An opening 133a is formed on the rear side surface 11 communicate the accommodation space S. The main body further includes a side cover 113b for enclosing the opening 113a to form the rear side surface 113 of the main body 110. The main body 110 further includes a fixing frame 130 disposed therein corresponding to the through hole 114.

Figure 5:
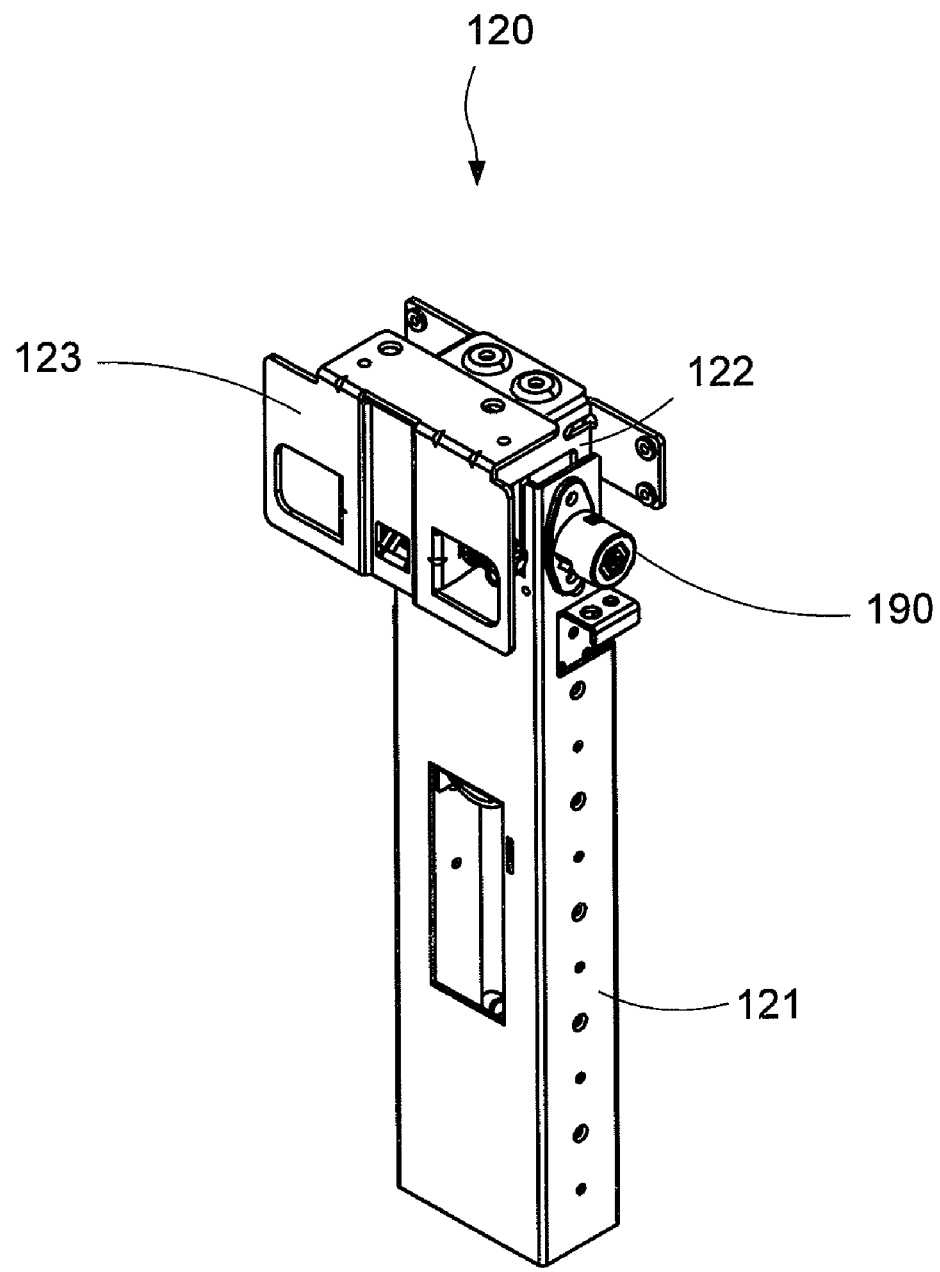
FIG. 5 is a perspective view of a rail assembly according to the embodiment of the present invention.
Figure 6:
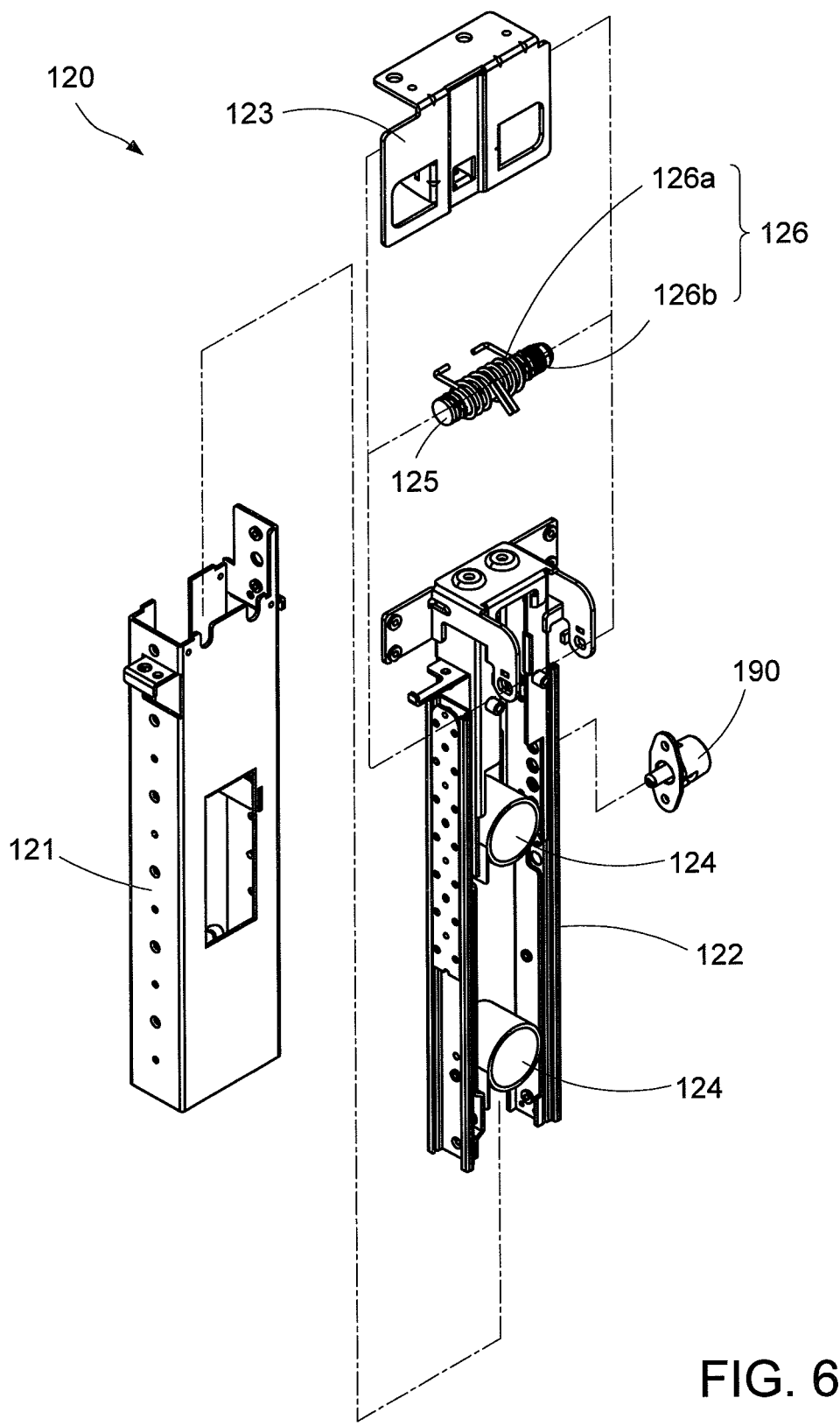
FIG. 6 is an exploded view of a rail assembly according to the embodiment of the present invention.

Referring to FIGS. 5 and 6, the rail assembly 120 includes a guide member 121, a slide member 122, a fixing member 123, and a plurality of elastic members 124.

The guide member 121 is disposed in the main body 110, and fixed to the fixing frame 130. The slide member 122 is movably combined with the guide member 121, and the guide member 121 extends toward the through hole 114. Therefore the slide member 122 is capable to be moved in a longitudinal direction of the guide member 121 to pass through the through hole 114 and to protrude out of the main body 110. In addition, the fixing member 123 is pivoted to a portion of the slide member 122 protruding out of the main body 110.

The fixing member 123 is pivoted to the slide member 122 through a shaft 125, and a friction element 126 is disposed between the fixing member 123 and the slide member 122. The friction element of the present invention includes a spring 126a and a friction washer 126b sleeved on the shaft 125, so as to provide a frictional force against the fixing member 123, such that the fixing member 123 is easily to be rotated relative to the slide member 122.

Referring to FIGS. 5 and 6, the elastic members 124 are disposed in the guide member 121, and connected to the guide member 121 and the slide member 122. In an embodiment of the present invention, the elastic members 124 are coil springs, each having one end connected to the guide member 121 and the other end connected to the slide member 122, and are used for generating an elastic force to move the slide member 122 in a direction extending out of the main body 110.

In order to ensure that the slide member 122 can be maintained at a fixed position, in an embodiment of the present invention, the casing 100 for an all-in-one electronic device further includes a locking device 190, disposed in the guide member 121, and exposed through a groove 116 on a surface of the main body 110. The locking device 190 is used for passing through a perforation of the guide member 121 and one of a plurality of positioning holes of the slide member 122, so as to fix a position of the slide member 122 relative to the guide member 121.

Figure 7B:
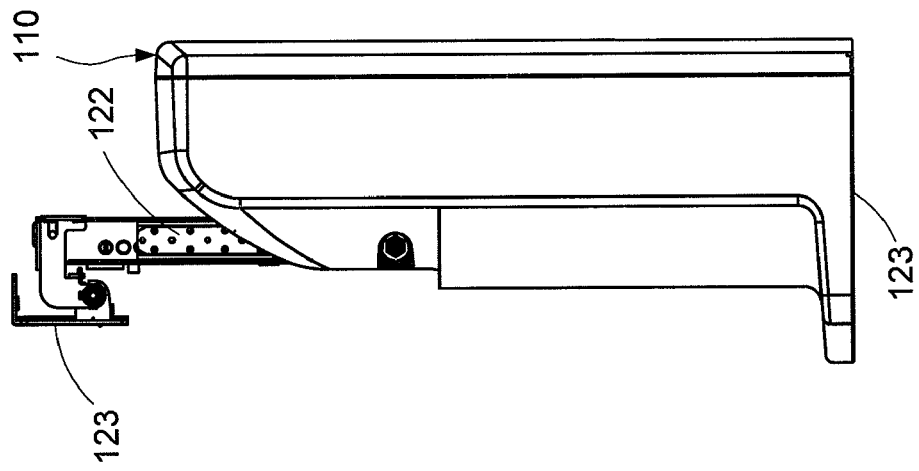
FIGS. 7A and 7B are side views according to the embodiment of the present invention.
Figure 7A:
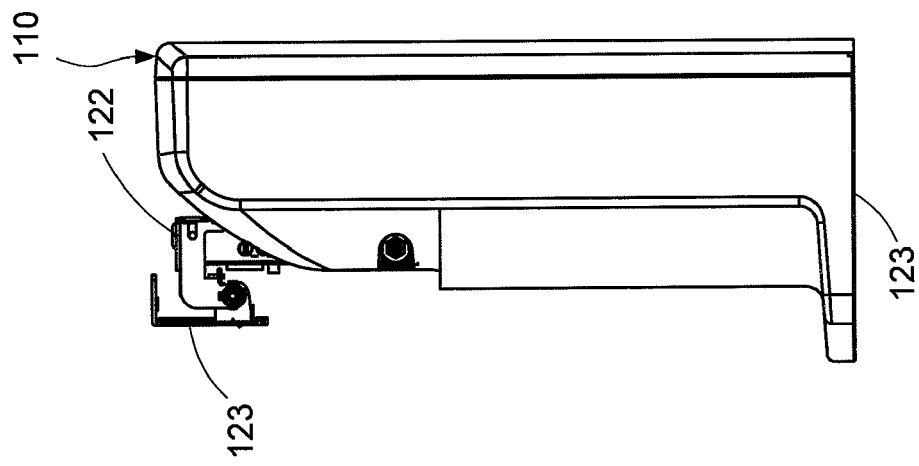

Referring to FIGS. 7A and 7B, in which by the slide member 122 sliding relative to the guide member 121, the slide member 122 can pass through the through hole 114, so as to change the height of one end thereof, that is, to change the height of the fixing member 123 relative to the bottom surface 111 of the main body 110. The fixing member 123 is used for fixing an object thereon and thus fixing the object to the main body 110, such that the height of the object can be changed along with the sliding of the slide member 122.

Figure 8:
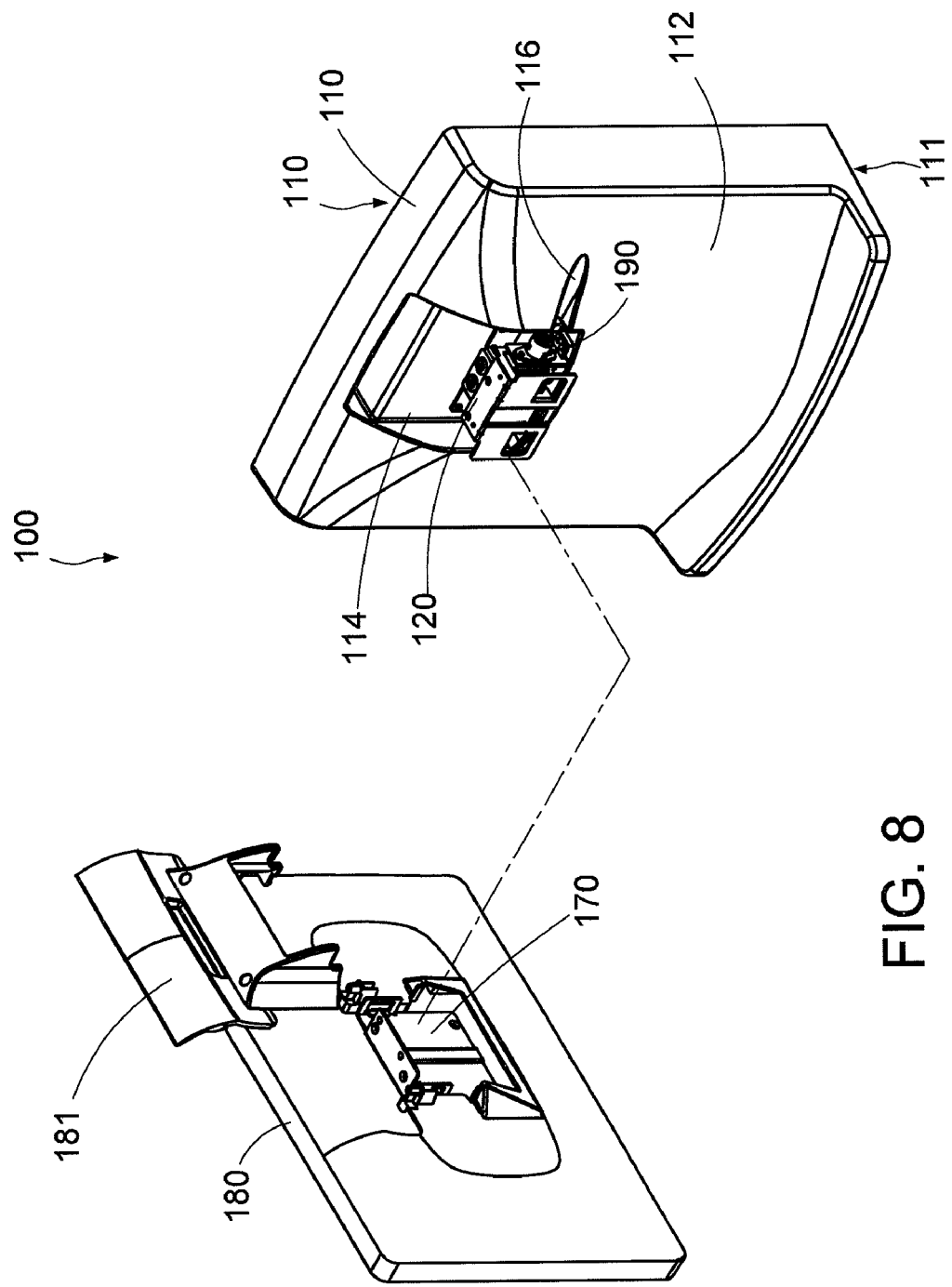
FIG. 8 is an exploded view according to the embodiment of the present invention.
Figure 9:
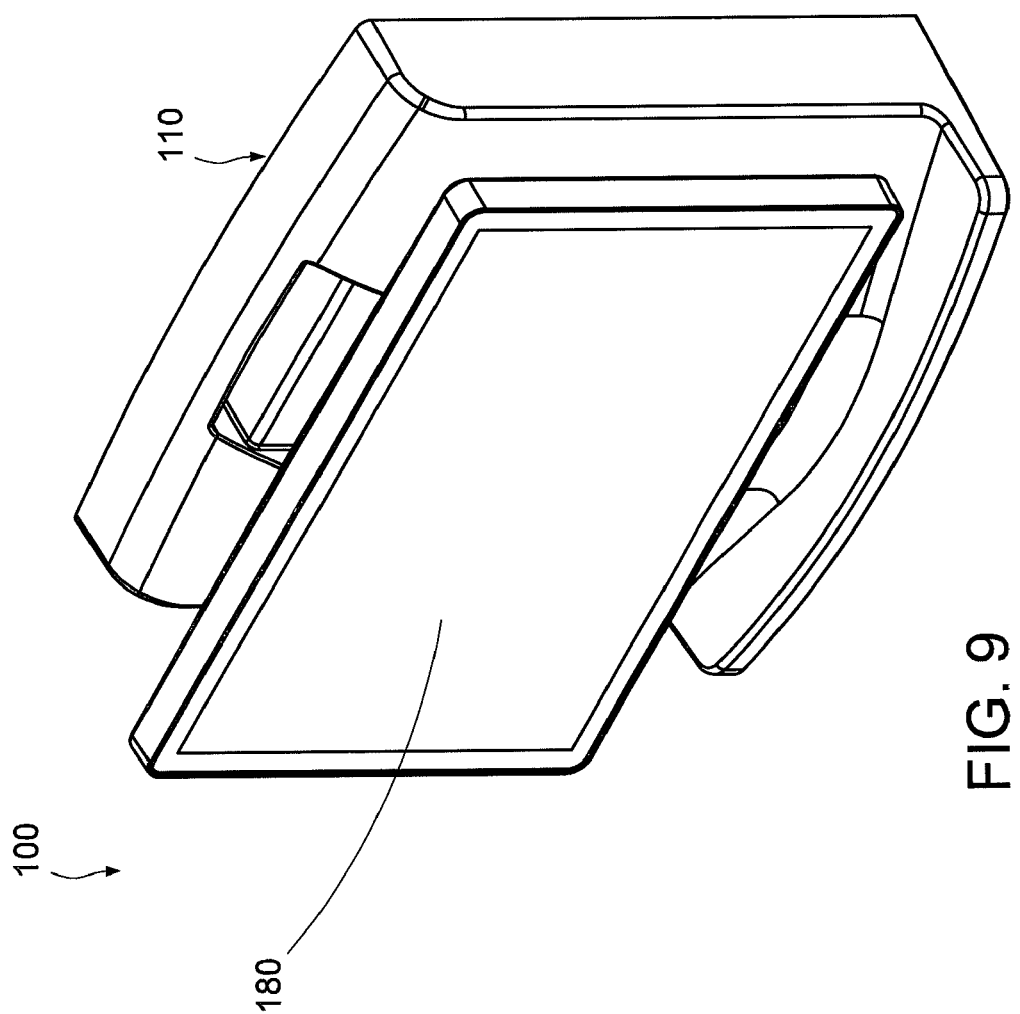
FIG. 9 is a perspective view according to an embodiment of the present invention.

Referring to FIGS. 8 and 9, in which in an embodiment of the present invention, the casing 100 for an all-in-one electronic device further includes a fastener 170 and a display 180.

Figure 10:
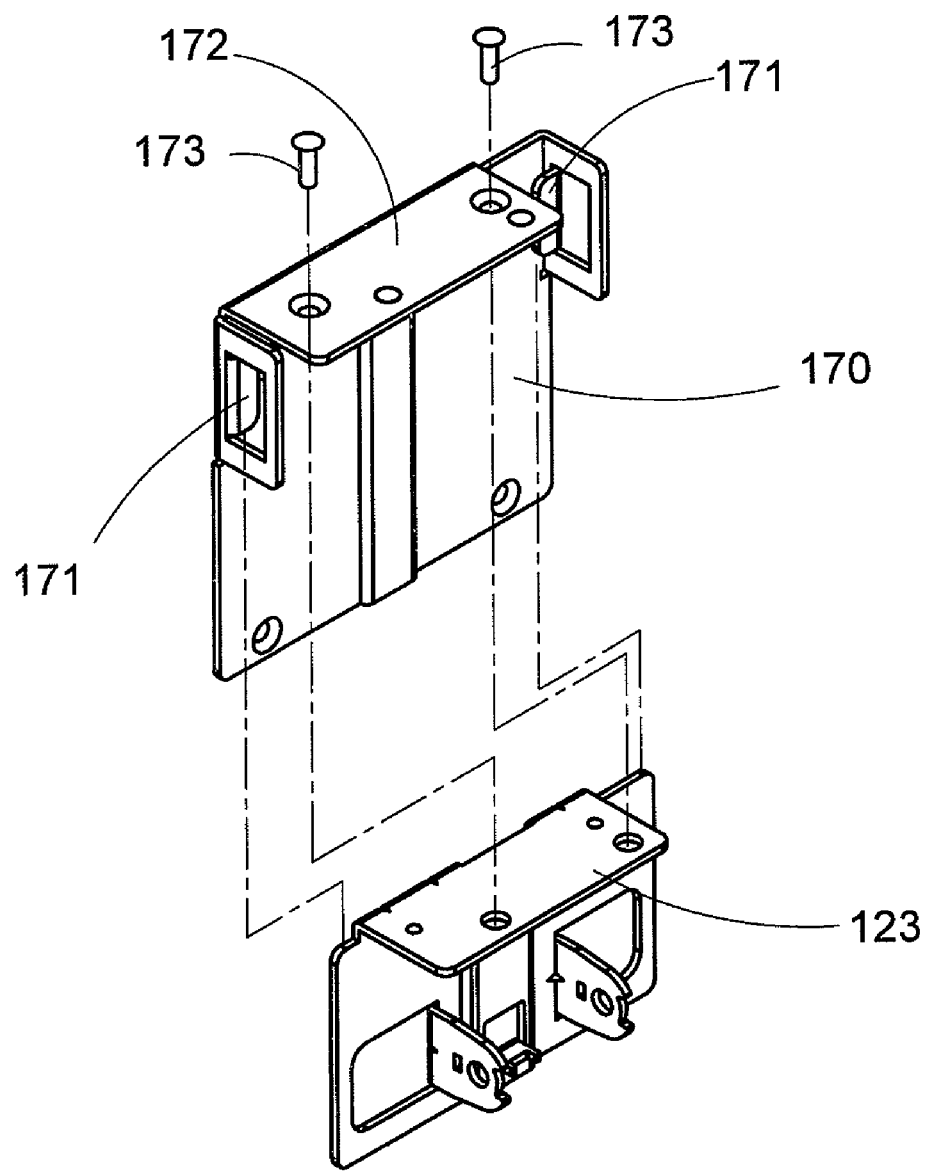
FIG. 10 is an exploded view of a fastener and a fixing member according to the embodiment of the present invention.

Referring to FIGS. 8 and 10, in which the fastener 170 is fixed to a rear surface of the display 180 for fastening the fixing member 123, and includes two clamping pieces 171 and a stopping piece 172. The clamping pieces 171 are used for clamping the fixing member 123, and the stopping piece 172 is used for stopping a top edge of the fixing member 123, so as to suspend the display 180 on the fixing member 123, thereby fixing the display 180 to the fixing member 123. In addition, a latching member 173 passes through the stopping piece 172 and is fixed to the fixing member 123, thereby enhancing the fixation.

Figure 11A:
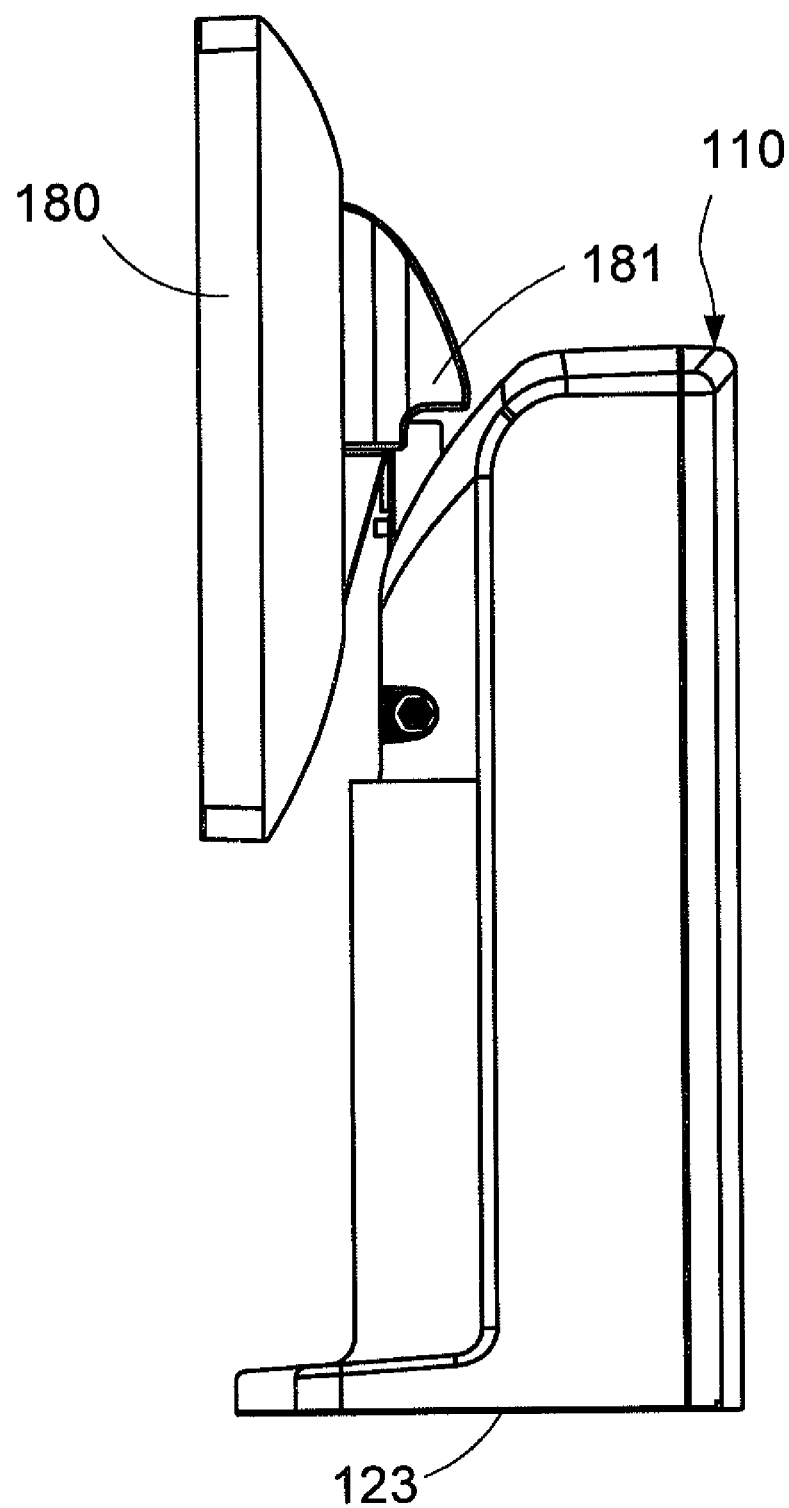
FIGS. 11A and 11B are side views according to the embodiment of the present invention.
Figure 11B:
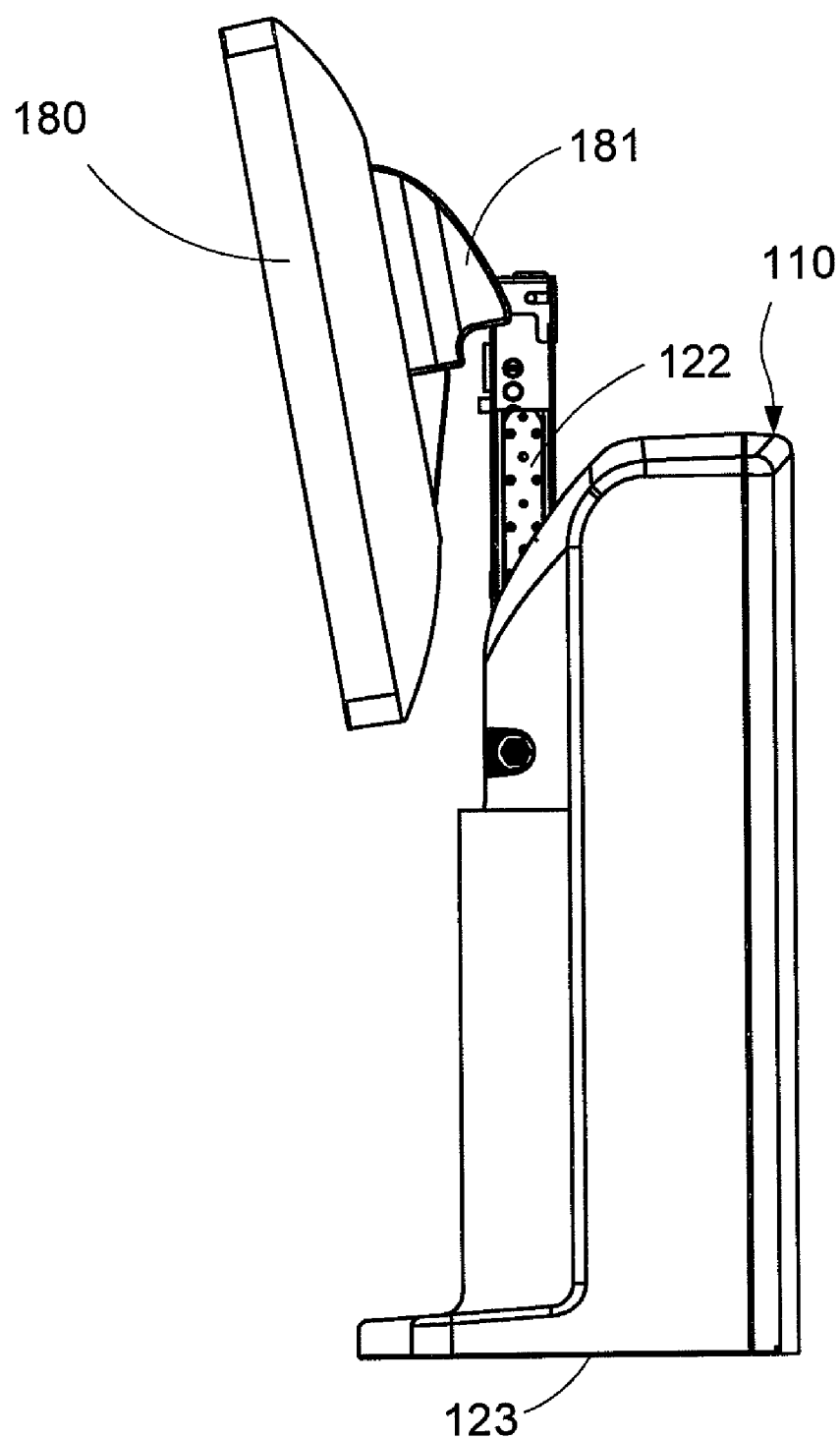

Referring to FIGS. 11A and 11B, by the fastener 170 fastening the fixing member 123, the display 180 is fixed to the slide member 122, and by the slide member 122 sliding on the guide member 121, the position of the display 180 relative to the main body 110 can be changed, thereby changing the height of the display 180 relative to the bottom surface 111 of the main body 110. In addition, since the fixing member 123 is pivoted to the slide member 122, the display 180 is also capable of swaying relative to the slide member 122, thereby facilitating user adjustment of the display angle 180.

Referring to FIG. 8, the casing 100 further includes a shielding cover 181 fixed to the display 180 for covering the fixing member 123 and the fastener 170, so as to prevent the fixing member 123 and the fastener 170 from being exposed, and provide an integral appearance for the display 180.

As described above, the elastic members 124 are disposed between the guide member 121 and the slide member 122, so that by the balance between pulling forces of the elastic members 124, a weight of the display 180, and a static friction force between the guide member 121 and the slide member 122, the display 180 can be maintained at a fixed position after the height of the display 180 is changed. The locking device 190 may further lock the slide member 122 to the guide member 121, thereby further fixing the height of the display 180.

In the present invention, since the display 180 is not combined within the main body 110, no space needs to be reserved in the main body 110 for disposing the display 180. Therefore, the casing 100 for an all-in-one electronic device of the present invention has a larger internal space compared with the all-in-one computer in the prior art, so that low-cost electronic components for desktop computers can be used, instead of using small but expensive electronic components for laptop computers.

Through the driving of the slide member 122, the height of the display 180 can be changed, and the display 180 can sway relative to the slide member, thereby facilitating user adjustment of the display angle 180.

In addition, in the present invention, the displays 180 of different sizes may be used in combination with the same main body 110 at will by the connection of the rail assembly. Therefore, compared with the all-in-one computer in the art, the present invention allows more choices with regard to the display 180, and since the display 180 is located outside the main body 110, the display 180 can be rapidly replaced by means of the user, thereby facilitating the replacement and repair of the display 180.

While the present invention has been described by means of the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A casing for an all-in-one electronic device, comprising:
   a main body, comprising a bottom surface, a rear side surface, and an through hole located opposite to the bottom surface, and the through hole communicating with an interior of the main body; and
   a rail assembly, comprising:
      a guide member, disposed in the main body, and extending toward the through hole; and
      a slide member, movably combined with the guide member to be moved in a longitudinal direction, to pass through the through hole and to protrude out of the main body;
   wherein an opening is formed on the rear side surface of the main body to communicate the interior of the main body, and the main body further comprises a side cover for enclosing the opening.

2. The casing for an all-in-one electronic device as claimed in claim 1, wherein the main body further comprises a front side surface the front side surface and the rear side surface respectively connected to two opposite side edges of the bottom surface.

3. The casing for an all-in-one electronic device as claimed in claim 2, wherein the front side surface is a convex curved-surface.

4. The casing for an all-in-one electronic device as claimed in claim 3, wherein the through hole is at least partially formed on the front side surface.

5. The casing for an all-in-one electronic device as claimed in claim 3, wherein the main body further comprises a top surface, located opposite to the bottom surface and connecting the front side surface and the rear side surface, the top surface and the front side surface are connected to each other to form a curved-surface, and the through hole extends from the front side surface to the top surface.

6. The casing for an all-in-one electronic device as claimed in claim 1, further comprising a locking device, for fixing a position of the slide member relative to the guide member.

7. The casing for an all-in-one electronic device as claimed in claim 1, further comprising a display, fixed to the slide member, to be driven by means of the slide member sliding on the guide member, so as to change a height of the display relative to the bottom surface of the main body.

8. A casing for an all-in-one electronic device comprising:
   a main body, comprising a bottom surface and an through hole located opposite to the bottom surface, and the through hole communicating with an interior of the main body;
   a rail assembly, comprising:
      a guide member, disposed in the main body, and extending toward the through hole; and
      a slide member, movably combined with the guide member to be moved in a longitudinal direction, to pass through the through hole and to protrude out of the main body;
   a display, fixed to the slide member, to be driven by means of the slide member sliding on the guide member, so as to change a height of the display relative to the bottom surface of the main body;
   a fixing member, pivoted to a portion of the slide member protruding out of the main body; and
   a fastener, fixed to the display, for fastening the fixing member to fix the display to the fixing member.

9. The casing for an all-in-one electronic device as claimed in claim 8, wherein the fixing member is pivoted to the slide member through a shaft, and a friction element is disposed between the fixing member and the slide member.

10. The casing for an all-in-one electronic device as claimed in claim 9, wherein the friction element comprises a spring and a friction washer sleeved on the shaft.

11. The casing for an all-in-one electronic device as claimed in claim 9, wherein the fastener comprises:
    two clamping pieces, for clamping the fixing member; and
    a stopping piece, for stopping a top edge of the fixing member.

12. The casing for an all-in-one electronic device as claimed in claim 11, further comprising a latching member, running through the stopping piece and fixed to the fixing member.

13. The casing for an all-in-one electronic device as claimed in claim 8, further comprising a shielding cover, fixed to the display for covering the fixing member and the fastener.

14. A casing for an all-in-one electronic device, comprising:
    a main body, comprising a bottom surface, a fixing frame, and an through hole located opposite to the bottom surface, the fixing frame being disposed in the interior of the main body and corresponding to the through hole, and the through hole communicating with an interior of the main body; and
    a rail assembly, comprising:
       a guide member, disposed in the main body, fixed to the fixing frame, and extending toward the through hole; and
       a slide member, movably combined with the guide member to be moved in a longitudinal direction, to pass through the through hole and to protrude out of the main body.

15. A casing for an all-in-one electronic device, comprising:
    a main body, comprising a bottom surface, and an through hole located opposite to the bottom surface, and the through hole communicating with an interior of the main body;
    a rail assembly, comprising:
       a guide member, disposed in the main body, and extending toward the through hole; and
       a slide member, movably combined with the guide member to be moved in a longitudinal direction, to pass through the through hole and to protrude out of the main body; and
    an elastic member, connected to the guide member and the slide member, for generating an elastic force to move the slide member in a direction extending out of the main body.

* * * * *